(12) United States Patent
Lindstrom et al.

(10) Patent No.: US 12,732,724 B2
(45) Date of Patent: Sep. 8, 2026

(54) DATA COLLECTION AND MONITORING FOR HYGIENE EQUIPMENT

(71) Applicant: Essity Hygiene and Health Aktiebolag, Gothenburg (SE)

(72) Inventors: Hakan Lindstrom, Gothenburg (SE); Annie Sporre Thorburn, Ellos (SE); Gunilla Himmelmann, Gothenburg (SE)

(73) Assignee: ESSITY HYGIENE AND HEALTH AKTIEBOLAG, Gothenburg (SE)

( * ) Notice: Subject to any disclaimer, the term of this patent is extended or adjusted under 35 U.S.C. 154(b) by 58 days.

(21) Appl. No.: 18/170,744

(22) Filed: Feb. 17, 2023

(65) Prior Publication Data

US 2023/0199349 A1 Jun. 22, 2023

Related U.S. Application Data

(63) Continuation of application No. 17/312,463, filed as application No. PCT/EP2018/086608 on Dec. 21, 2018, now abandoned.

(51) Int. Cl.
*H04Q 9/00* (2006.01)
*H04W 76/14* (2018.01)

(52) U.S. Cl.
CPC .......... *H04Q 9/00* (2013.01); *H04Q 2209/40* (2013.01); *H04W 76/14* (2018.02)

(58) Field of Classification Search
CPC .......... H04Q 2209/00; H04Q 2209/10; H04Q 2209/40; H04Q 2209/73; H04Q 2209/70; H04Q 2209/80; H04Q 2209/82; H04Q 2209/826; H04Q 9/00; H04W 76/14
See application file for complete search history.

(56) References Cited

U.S. PATENT DOCUMENTS 8,907,782 B2 * 12/2014 Baker .................... A61B 5/021 342/450
9,478,126 B2 * 10/2016 Berziel .................. G08C 17/02
9,656,621 B2 * 5/2017 Curtis .................. G08B 21/182
9,659,481 B2 * 5/2017 Himmelmann .............................. G06Q 10/063118

(Continued)

FOREIGN PATENT DOCUMENTS

AU 2012254922 A1 * 6/2014 .............. G01P 15/00
AU 2014227493 A1 4/2015

(Continued)

OTHER PUBLICATIONS

International Search Report with Written Opinion for International Application No. PCT/EP2018/086608; Application Filing Date Dec. 21, 2018; Date of Mailing Jun. 24, 2019 (11 pages).

(Continued)

*Primary Examiner* — Franklin D Balseca
(74) *Attorney, Agent, or Firm* — CANTOR COLBURN LLP

(57) ABSTRACT

A data collection unit arranged to collect data indicating hygiene equipment status includes a receiving unit configured to receive inbound data from hygiene equipment; and a transmitting unit configured to transmit outbound data directly to a terminal via device-to-device, D2D, communication; wherein the outbound data is based on the inbound data.

17 Claims, 6 Drawing Sheets

(56) References Cited

U.S. PATENT DOCUMENTS

| | | | | |
|---|---|---|---|---|
| 9,661,679 | B2 * | 5/2017 | Kang | H04W 8/005 |
| 9,892,372 | B2 | 2/2018 | Himmelmann et al. | |
| 10,194,512 | B2 * | 1/2019 | Strods | H04Q 9/00 |
| 10,225,713 | B2 | 3/2019 | Wu et al. | |
| 10,281,166 | B1 * | 5/2019 | Hutz | H04L 12/2825 |
| 10,365,139 | B2 | 7/2019 | Singh et al. | |
| 10,505,794 | B2 | 12/2019 | Wass et al. | |
| 10,573,161 | B2 | 2/2020 | Engelhard et al. | |
| 11,038,609 | B2 * | 6/2021 | Matsunaga | G08C 15/06 |
| 2008/0090612 | A1 * | 4/2008 | Glinka | H04L 63/18 455/557 |
| 2015/0366411 | A1 | 12/2015 | Yang et al. | |
| 2017/0220985 | A1 | 8/2017 | White et al. | |

FOREIGN PATENT DOCUMENTS

| | | | | |
|---|---|---|---|---|
| CN | 104731048 A | | 6/2015 | |
| CN | 105492058 A | | 4/2016 | |
| CN | 105981350 A | | 9/2016 | |
| CN | 106537439 A | | 3/2017 | |
| EP | 3267378 A1 | | 1/2018 | |
| KR | 20160037535 A | * | 4/2016 | B60R 16/02 |
| WO | 2014035307 A1 | | 3/2014 | |

OTHER PUBLICATIONS

Office Action issued in Chinese Patent Application No. 201880100277.8; Application Filing Date Dec. 21, 2018; Date of Mailing Jul. 21, 2023 (20 pages).

Search Report issued in European Patent Application No. 18826378.4; Application Filing Date Dec. 21, 2018; Date of Mailing Jul. 17, 2023 (6 pages).

Office Action issued in Chinese Patent Application No. 201880100277.8; Application Filing Date Dec. 21, 2018; Date of Mailing May 31, 2024 (20 pages).

Chinese Application No. 201880100277.8; Office Action with English translation dated May 31, 2024; 20 pages.

European Patent Application No. 18826378.4; Office Action dated Mar. 18, 2025; 6 pages.

* cited by examiner

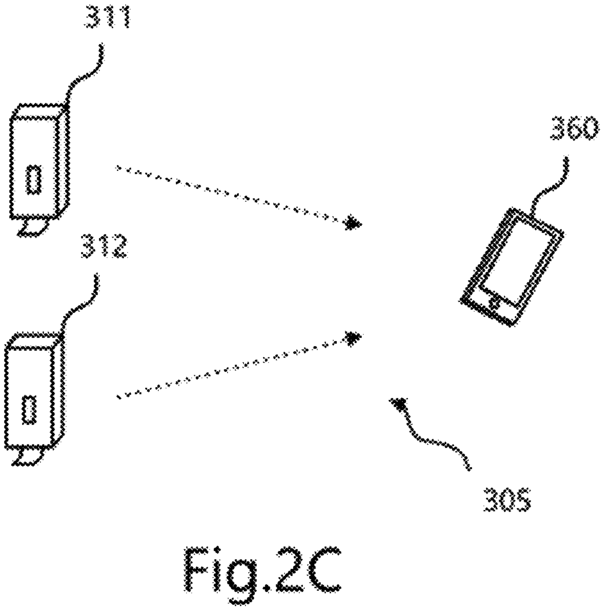
Fig.2C
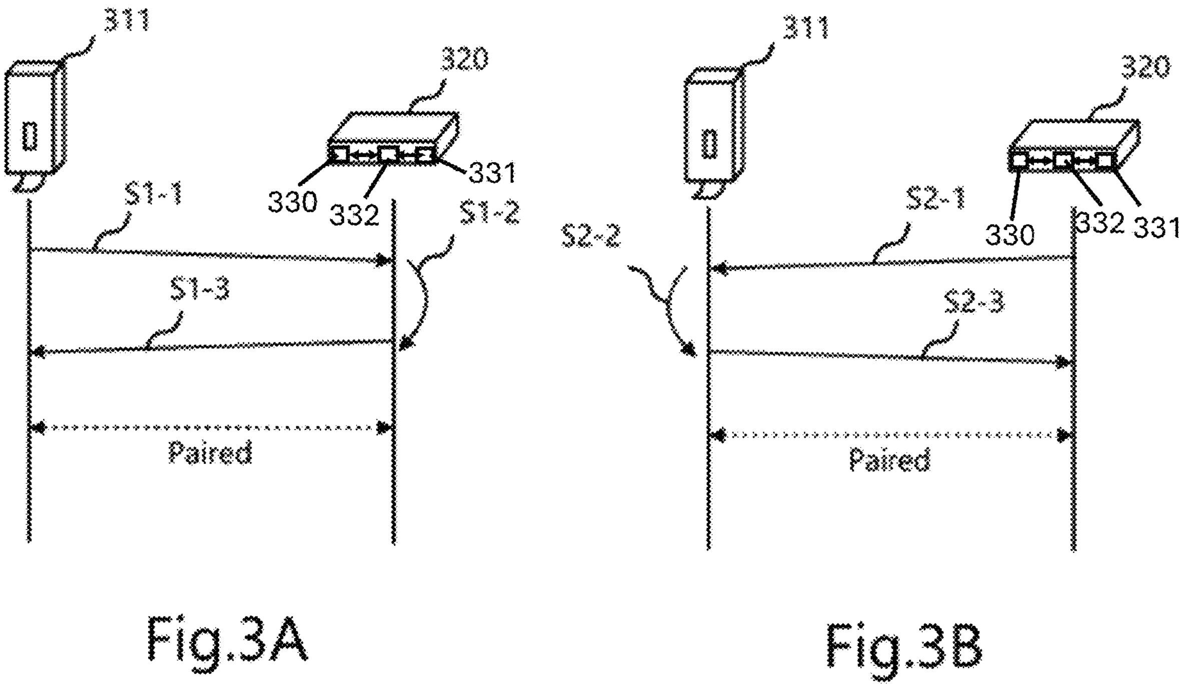
Fig.3A
Fig.3B

DATA COLLECTION AND MONITORING FOR HYGIENE EQUIPMENT

CROSS REFERENCE TO RELATED APPLICATION

The present application is a continuation of U.S. application Ser. No. 17/312,463, filed Jun. 10, 2021, which is a U.S. National Stage entry under 35 U.S.C. § 371 of, and claims priority to, International Application No. PCT/EP2018/086608, filed Dec. 21, 2018, the disclosure of which is hereby incorporated herein by reference in its entirety.

FIELD OF THE INVENTION

The present invention relates to the field of a data collection and monitoring system for monitoring a hygiene equipment status, a method thereof and a data collection unit arranged to collect data indicating hygiene equipment status. Specifically, the present invention relates to a data collection and monitoring system comprising a data collection unit configured to receive inbound data indicating the hygiene equipment status and to transmit outbound data, and a terminal configured to receive the outbound data from the data collection unit, wherein the data collection unit is configured to transmit the outbound data directly to the terminal via device-to-device communication.

BACKGROUND OF THE INVENTION

Today, the need for proper hygiene, in particular in the form of hand hygiene, is widely acknowledged. For this reason, public or commercial facilities such as washrooms in public buildings, offices, restaurants, airports, hospitals, shopping malls and so on are normally provided with dispensers for various consumable goods, for example paper towels, liquid soap, and toilet paper. The purpose is to make such consumables easily available to the guests in the washrooms.

Consumables are normally stored in said dispensers, which for this purpose are fixedly located at suitable positions in the washroom. A dispenser can, for example, be in the form of a holder for paper towels, a holder for toilet paper or a container for liquid soap. Other types of dispensers, for example waste bins, are also used.

The task of checking the level of each consumable, and refilling a dispenser when necessary, i.e., when the level of the consumable is low, or emptying a bin when the level of the consumable is high, is normally assigned to a cleaning staff or a janitor.

One problem for a janitor is to know when a dispenser needs refilling to avoid, for example, a guest of a washing room being left without paper, soap, etc. In addition, the janitor needs to know which dispensers need to be refilled and how much consumable material to bring when servicing an area containing a number of dispensers. Furthermore, from a management point of view, it can be difficult to know in advance how many consumable products should be ordered and kept in stock. For these reasons, there is a need for dispensers which are arranged for monitoring the actual use of the consumable and for signaling in some suitable manner to a central service office that, for example, a particular dispenser needs refilling. To this end, it is known that a modern dispenser may comprise one or more sensors which are arranged for detecting the level of the consumable within the dispenser. Generally, such sensors can be arranged for recognizing any condition indicating that the level of a consumable is low, i.e., by detecting that the level of the consumable is below a predetermined threshold value. The sensor in question can, for example, be based on an infrared sensor which is arranged for detecting when the height of a paper stack, such as a stack of paper towels in a dispenser, falls below a specified low paper threshold. This threshold corresponds to a condition in which the dispenser needs refilling.

There exist also solutions in which a dispenser is arranged for automatically dispensing a consumable. An example is an automatic soap dispenser which is arranged for automatically discharging a small amount of soap when a user holds a hand under an output nozzle of the dispenser. Such a dispenser can be arranged with sensor arrangements which keep track of the number of occasions that the nozzle has been actuated. The number of occasions can then be used for estimating the amount of consumable which has been fed from the dispenser, and consequently also the remaining amount. When a predetermined minimum threshold has been reached, the dispenser can send a signal to a central service office indicating that it needs refilling.

Other types of sensors can, for example, be based on a light emitting diode and a photodetector which together can be used for detecting the level of a consumable within a dispenser. A further example is a counter device counting the number of turns on a toilet paper dispenser, wherein the accumulated number of turns corresponds to a certain consumption of toilet paper.

Furthermore, sensors can not only be used for dispensers, but also for other types of non-dispensing or non-disposing pieces of hygiene equipment. For example, non-dispensing or non-disposing pieces of hygiene equipment may be units having sensors for counting a number of people being present, for counting a number of people passing the sensor, i.e., visitor registration units, door passage units, or the like. A visitor registration unit may comprise a sensor which detects the presence or absence of people in, for example, a washing room or any other predefined area. If the sensor has counted a minimum number of people having been present in the area after, for example, the last cleaning, the sensor may alarm a cleaning staff or any other person being responsible for cleaning the area that cleaning the predefined area is necessary. The visitor registration unit may not only register the presence of people in one room or predefined area but may also count how many times a sink, a toilet, or any other equipment has been used. If the number of usages exceeds a predefined threshold, the cleaning staff or any other person being responsible for cleaning the equipment comprising the visitor registration unit may be alarmed to clean the specific equipment. This kind of sensor may, for example, further detect specific people which may, for example, use tags to be identified. In this matter, the sensor may identify a person from the cleaning staff and may reset the value of how many people have been counted in the respective room, as it is assumed that the room has been cleaned with the presence of someone from the cleaning staff. Thus, the counting process until the next cleaning may be restarted.

A sensor for a door passage unit may work similar to a visitor registration unit, wherein the sensor in the door passage unit may register how many people have passed through the door. If a predefined number of people have passed through the door, i.e., a threshold has been exceeded, the cleaning staff or any other person responsible for cleaning, may be alarmed to clean the corresponding room, etc. Also, in this case, it may be possible to provide a sensor in the door passage unit which is able to identify people wearing a tag in order to identify when someone from the cleaning staff enters the room and thus may clean the room. Thus, the counting process until the next cleaning may be restarted.

As described above, a sensor which is associated with a dispensing or disposing hygiene equipment, like a dispenser for a consumable, a waste bin, etc., or non-dispensing hygiene equipment, like visitor registration units, door passage units, etc., can be connected to a central service office, i.e., to a central computer server, so that the server is notified when a particular dispenser needs refilling or when a specific, room, area, or equipment has to be cleaned after a specific number of people has been present in the room or has used the equipment, or has passed through a door. A notification relating to a dispenser low condition or to a condition of frequent usage can then be forwarded to members of a cleaning staff, who then has the responsibility of refilling/emptying that particular dispenser or cleaning the room, hygiene equipment, or the like as soon as possible.

A particular problem which is relevant with regard to a monitoring system of the above-described type is that the system needs to be installed in a complete building, something that costs both time and resources. In addition, installing such a complex system may be an undue burden for someone not having any experience with such a system or does not have the required know-how for installation. Thus, a particular problem with regard to a monitoring system as described above is that installation may be costly, time-consuming, and complicated for a user having no experience and know-how for installing such a system. A further problem may occur when the monitoring system has to be connected to pre-existing networks, like the internet, which may be seen as complex and/or intrusive.

SUMMARY OF THE INVENTION

Consequently, it is an aspect of the present invention to solve the above-described problem and provide a data collection and monitoring system which can be used by users who want to experience the advantages of a data collection and monitoring system without having to perform a complete installation. Thus, it is an aspect of the present invention to provide a data collection unit, a data collection and monitoring system, and a method thereof, wherein the installation thereof is easy, time-saving, and cost-efficient.

According to an aspect of the present invention, there is provided a data collection unit arranged to collect data indicating hygiene equipment status, the data collection unit comprising a receiving unit configured to receive inbound data from hygiene equipment, and a transmitting unit configured to transmit outbound data directly to a terminal via device-to-device (D2D) communication, wherein the outbound data is based on the inbound data.

According to another aspect of the present invention, there is provided a terminal arranged to collect data indicating hygiene equipment status, the terminal comprising a receiving unit configured to receive inbound data directly from hygiene equipment via device-to-device (D2D) communication, and an output unit configured to output outbound data, wherein the outbound data is based on the inbound data.

According to another aspect of the present invention, there is provided a data collection and monitoring system for monitoring a hygiene equipment status, the data collection and monitoring system comprising a data collection unit configured to receive, from hygiene equipment, inbound data indicating the hygiene equipment status and to transmit outbound data; and a terminal configured to receive the outbound data from the data collection unit. The data collection unit is configured to transmit the outbound data directly to the terminal via device-to-device, D2D, communication, wherein the outbound data is based on the inbound data.

According to another aspect of the present invention, there is provided a method for monitoring a hygiene equipment status, the method comprising the steps of receiving, by a data collection unit, inbound data indicating the hygiene equipment status from hygiene equipment; transmitting, by the data collection unit, outbound data directly to a terminal via device-to-device, D2D, communication; and receiving, by the terminal, the outbound data from the data collection unit. In this matter, the outbound data is based on the inbound data.

BRIEF DESCRIPTION OF THE DRAWINGS

Embodiments of the present invention, which are presented for better understanding the inventive concepts and which are not to be seen as limiting the present invention, will now be described with reference to the Figures in which:

FIGS. 2B and 2C show schematic views of a data collection and monitoring system according to an embodiment of the present invention;

FIGS. 3A and 3B show schematic views of a pairing process;

DETAILED DESCRIPTION OF THE INVENTION

Figure 1:
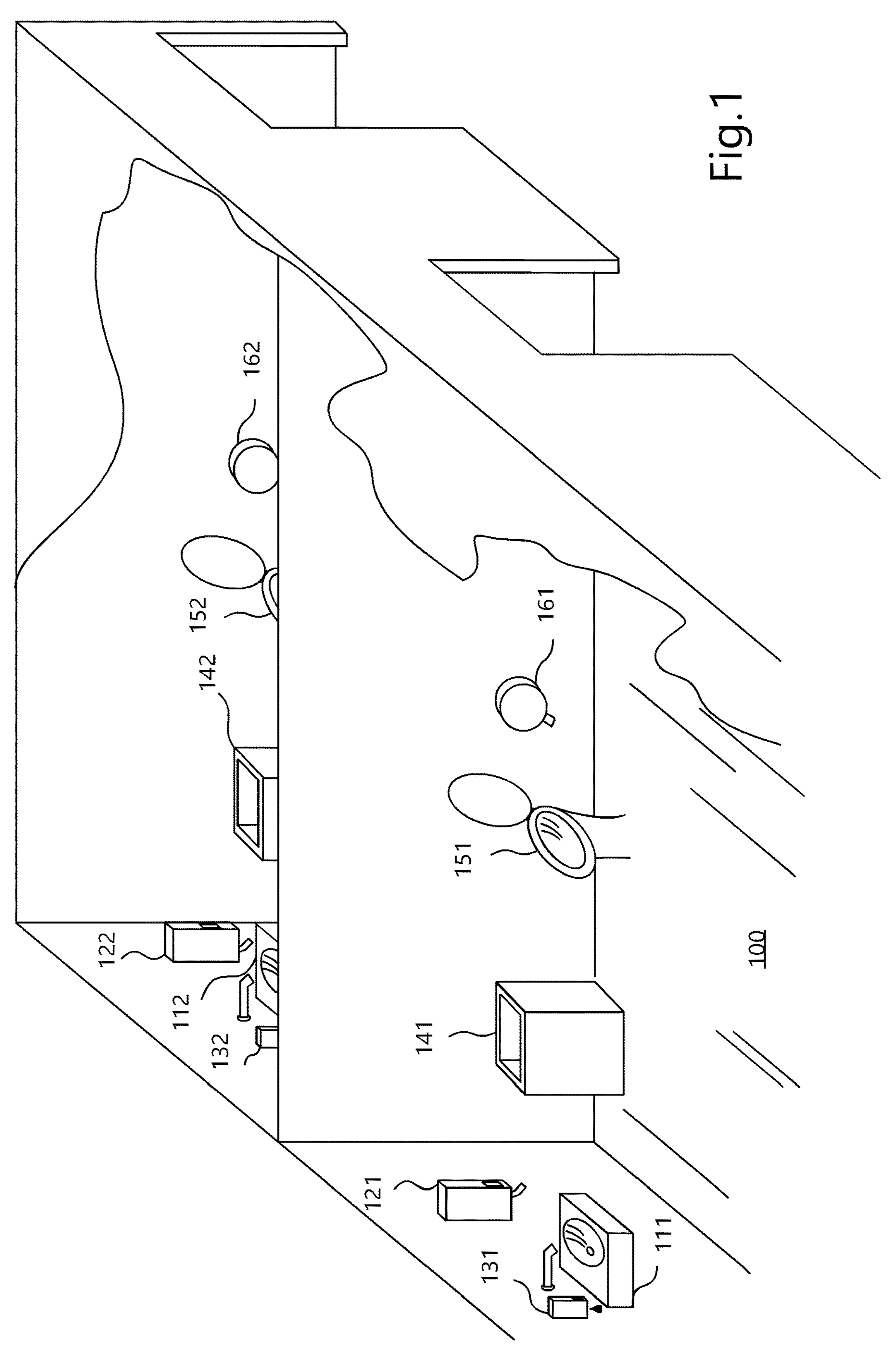
FIG. 1 shows a schematic view of a typical environment where the actual usage of hygiene equipment in combination with a data collection and monitoring system is illustrated.

FIG. 1 shows a schematic view of a typical environment where the actual usage of hygiene equipment in combination with a data collection and monitoring system is shown. As an example, there is shown two adjacent restrooms 100, each having a washing sink 111, 112, a paper towel dispenser 121, 122, a soap dispenser 131, 132, a waste bin 141, 142, a toilet 151, 152, and a toilet paper dispenser 161, 162. This kind of setup may be, for example, given in a gas station, restaurant or café. Further examples for possible working environments include hospitals and medical service centers, day clinics, private practices, lavatories, hotels, food service places, schools, kindergartens, manufacturing sites, administration and office buildings, and, in broad terms, places and facilities that are accessible to the public or to a considerable number of individuals.

The configuration shown in FIG. 1 can acquire data indicating the usage of the hygiene equipment from equipment sensor arrangement provided for or in one or more of the individual pieces of hygiene equipment, such as the washing sinks 111 and 112, the paper towel dispensers 121 and 122, the soap dispensers 131 and 132, the waste bins 141 and 142, the toilets 151 and 152, and the toilet paper dispensers 161 and 162. In this way, the system may be able to receive usage data from these pieces of hygiene equipment as possibly individual signals from each corresponding device/sensor, i.e., data acquisition unit.

In the present invention, the data acquisition units located in the pieces of hygiene equipment may acquire data indicating hygiene equipment status. The status of a piece of hygiene equipment may be, for example, how full/empty a piece of hygiene equipment storing consumable, e.g., a dispenser, is, how full/empty a waste bin is, how often a piece of hygiene equipment, for example a washing sink, has been used, or how often a room has been visited by someone using the washing room, etc. Depending on the status of the piece of hygiene equipment, the janitor or cleaning staff may determine whether or not the piece of hygiene equipment storing consumable has to be refilled, whether or not the piece of hygiene equipment, e.g., a waste bin, has to be emptied, or whether or not the piece of hygiene equipment, e.g. a washing sink, or the whole room has to be cleaned if the piece of hygiene equipment has, for example, been used frequently or if the room has been visited multiple times by individuals.

Normally, the data generated by the data acquisition units may be collected by some kind of data collection unit (not shown), which may be placed in the transmission range of the data acquisition units. The data collection unit may interact with the data acquisition units 131-162 that act as data sources for data indicating hygiene equipment status. These data acquisition units 131-162 may thus form part of distributed data acquisition equipment and measure—respectively—towel-, tissue-, soap consumption-, filling levels, or number of usage.

Figure 2A:
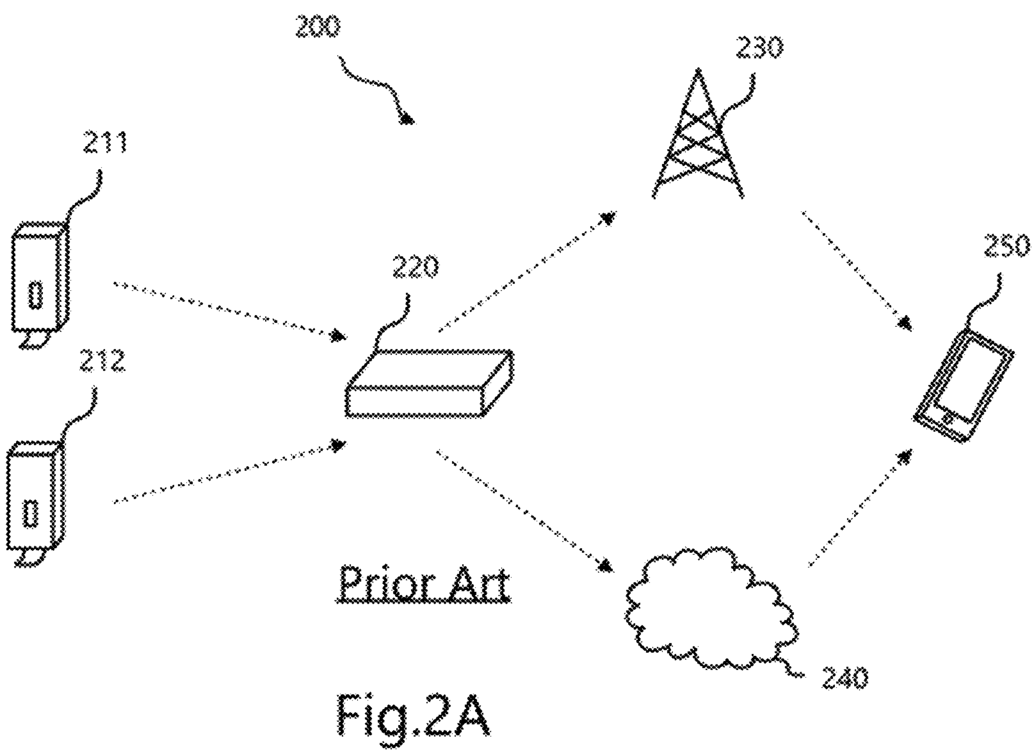
FIG. 2A shows a schematic view of a data collection and monitoring system according to the prior art.

FIG. 2A illustrates a data collection and monitoring system 200, in particular an interaction between a data collection unit 220 and data acquisition units 211 and 212 as given in the prior art. The data collection unit 220 is similar to the data collection unit described with reference to FIG. 1 and the data acquisition units 211 and 212 may be any type of distributed equipment, i.e., sensor types, as described in more detail above. In the prior art, the data collection unit 220 receives the data from the data acquisition units 211 and 212 by, for example, a short-range wireless network (e.g., IrDA, IEEE802.15.4, Zigbee, RF4CE, SP100, IEEE802.il, Bluetooth™, or similar technologies) that conveys the sensor data from the data acquisition units 211 and 212 to the data collection unit 220. In a sense, said data collection unit 220 may collect data from one or more data acquisition units 211, 212 and forward it in bundled fashion to a next entity 230 in the chain, for example, by means of employing an intermediate-range wireless network (e.g. WLAN, GSM, GPRS, UMTS, 3GPP, LTE or similar technologies). From there, the sensor data may be routed via one or more LAN(s) and/or the internet to a terminal 250. The terminal 250 may be any type of user device or personal computing device such as smart phone, desktop computer, tablet, smart watch, laptop computer, or the like, and may display the data received from the entity 230. Instead of transmitting the data from the data collection unit 220 to the terminal 250 via the entity 230, the data may be also sent to the terminal 250 via a Cloud system 240.

Data collection and monitoring systems, such as the data collection and monitoring system 200 as described with reference to FIG. 2A, are very successful and well-established. However, data collection and monitoring systems as described in the prior art need to be installed in a complete building or a larger area to be beneficial and need to be connected to, for example, established intermediate-range wireless networks as described above which may lead to great costs and to high complexity for installing the data collection and monitoring system.

The problem about the complexity of installing such a data collection and monitoring system as described with reference to FIG. 2A may become clear with reference to the exemplary setting illustrated in FIG. 1.

FIG. 1 may, for example, show an exemplary washing room of a small café, restaurant, gas station, or any other isolated and compact environment which has not been provided with any data collection and monitoring system before. FIG. 1 is just an exemplary description of two ordinary, adjacent, washing rooms or restrooms and is not limited for the present invention. In FIG. 1, as described in more details above, two separate, small washing rooms each having a washing sink 111 or 112, a paper towel dispensers 121 or 122, a soap dispenser 131 or 132, a waste bin 141 or 142, a toilet 151 or 152, and a toilet paper dispenser 161 or 162. The washing rooms may further or instead comprise non-disposing or non-dispensing hygiene equipment as described above in order to count the usages of a hygiene equipment or the number of people using the washing rooms.

The owner of the small café, restaurant, or gas station may wish to install a data collection and monitoring system, for example data acquisition units and a data collection unit in the washing room in order to detect the filling status of the towel dispensers 121, 122, the soap dispensers 131, 132, the waste bins 141 and 142, and the toilet paper dispensers 161, 162. The owner may furthermore or instead wish to install data acquisition units for non-disposing/non-dispensing hygiene equipment, like washing sinks 111, 112, and/or toilets 151, 152 in order to count how frequently the non-disposing/non-dispensing hygiene equipment has been used to estimate when the non-disposing/non-dispensing hygiene equipment should be cleaned. Another option is to place passage door units or visitor registration units which count the number of visitors in the washing rooms to estimate the time for the next cleaning.

However, installing such a complex system as described with reference to FIG. 2A in a small environment as, for example, in a washing room of a small café, restaurant, or gas station may be an undue and unnecessary burden for someone not having any experience with such a system or does not have the required know-how or resources for installation.

Thus, in order to reduce the cost for installation, reduce the time needed for installation, and reducing the complexity for a data collection and monitoring system, an embodiment of a data collection and monitoring system 300 according to the present invention is described with reference to FIG. 2B.

Figure 2B:
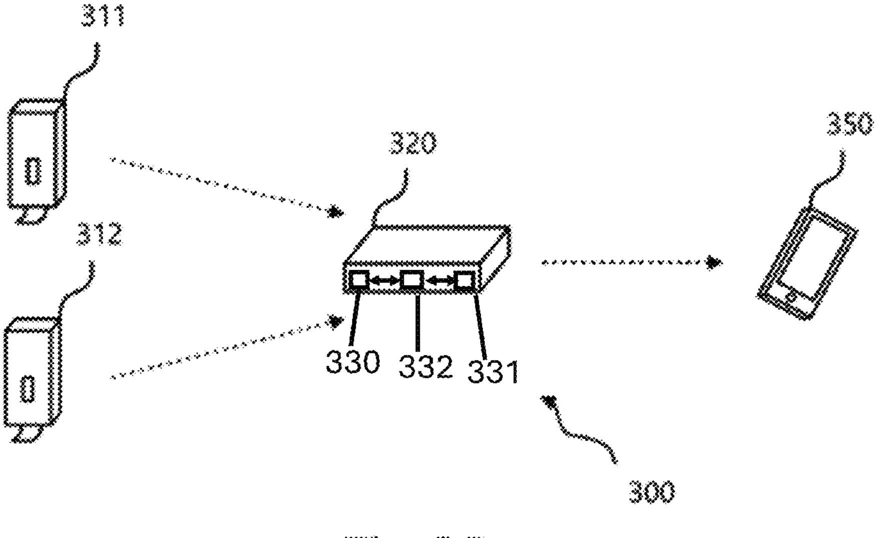

In FIG. 2B, a data collection and monitoring system 300 overcoming the problems of the data collection and monitoring system 200 is shown. In more detail, the data collection and monitoring system 300 for monitoring a hygiene equipment status may comprise a data collection unit 320 configured to receive, from hygiene equipment, inbound data indicating the hygiene equipment status and to transmit outbound data, and a terminal 350 configured to receive the outbound data from the data collection unit. The terminal 350 may be any type of user device or personal computing device as described in more detail above.

Inbound data indicating the hygiene equipment status may be acquired by data acquisition units 311, 312, wherein any number of data acquisition units 311, 312 may send their acquired data to the data collection unit 320. The data acquisition units 311, 312 can be of any type of data acquisition units, for example for measuring the filling status of any type of dispenser or waste bin or for counting the number of usages of a hygiene equipment or a room, etc. For the communication between the data acquisition units 311, 312, any type of short-range communication may be used.

The data collection unit 320 is configured to transmit outbound data, wherein the outbound data is based on the inbound data and may be the inbound data or data resulting from processing the inbound data. Data processing will be described in more detail below.

Instead of using a network or Cloud system for transmitting the outbound data from the data collection unit 320 to the terminal 350, the data collection unit 320 is configured to transmit the outbound data directly to the terminal 350 via device-to-device (D2D) communication. In other words, the data collection unit 320 is configured in such a way that the outbound data is not transmitted to the terminal 350 via a network 230 or Cloud system 240 as shown in FIG. 2A, but the outbound data is transmitted from the data collection unit 320 to the terminal 350 independent of pre-existing infrastructure, such as routers or access points.

D2D communication thereby is defined as direct communication between two devices without traversing a base station or core network. Existing data delivery protocols in D2D communications mainly assume that devices willingly participate in data delivery, share their resources with each other, and follow the rules of underlying networking protocols.

D2D communication may be, for example, realized by the Wi-Fi Direct standard, wherein the Wi-Fi Direct standard is a Wi-Fi standard enabling devices to easily connect with each other without requiring a wireless access point. Hence, Wi-Fi Direct is a single radio hop communication and becomes a way of communication wirelessly, much like Bluetooth. One advantage of Wi-Fi Direct is the ability to connect devices even if they are from different manufacturers, as only one of the Wi-Fi devices needs to be compliant with Wi-Fi Direct to establish a peer-to-peer connection that transfers data directly. In the case of the present invention, this means that not both the data collection unit 320 and the terminal 350 may be compliant with Wi-Fi Direct, but only the data collection unit 320 may need to be compliant with Wi-Fi Direct, while the terminal 350 may solely support WLAN (Wireless Local Area Network).

For the communication between the data acquisition units and the data collection unit, a short-range communication network as described above or also D2D communication, or Wi-Fi Direct communication can be used depending on the scenario in which the data collection and monitoring system 300 is installed.

Thus, a data collection unit 320, as illustrated in FIG. 2B, arranged to collect data indicating hygiene equipment status according to the present invention may comprise a receiving unit 330 configured to receive inbound data from hygiene equipment, and a transmitting unit 331 configured to transmit outbound data directly to a terminal via D2D communication. In this matter, the outbound data is based on the inbound data.

The terminal 350 may be configured to process the outbound data received from the data collection unit 320. The terminal 350 may furthermore output data indicating the hygiene equipment status, the data being based on the received outbound data from the data collection unit 320. For example, the terminal 350 may output an alarm or alert to a user indicating that the hygiene equipment status has exceeded or has fallen under a predetermined threshold, such that the respective pieces of hygiene equipment have to be emptied or refilled.

In order to facilitate mounting of such a data collection and monitoring system 300, the data acquisition units 311, 312 may be paired to the data collection unit 320 before the data acquisition units 311, 312 and the data collection unit 320 are mounted. In other words, the data acquisition units 311, 312 and the data collection unit 320 may be pre-paired such that the data acquisition units 311, 312 send their acquired data directly to the data collection unit 320 to which they are paired without the need of performing a complicated pairing process. The term "pre-paired" may refer to pairing the data acquisition units 311, 312 and the corresponding data collection unit 320 already in the production facility before being delivered to the customer requesting the data acquisition units 311, 312 and the data collection unit 320. The acquired data again indicates the hygiene equipment standard of pieces of hygiene equipment in which the data acquisition units 311, 312 are respectively located.

For example, if a user or owner of a small café, restaurant, gas station, or any other isolated and compact facility being interested in a data collection and monitoring system 300 purchases the data acquisition units 311, 312 and the data collection unit 320, wherein the data acquisition units 311, 312 and the data collection unit 320 are pre-paired, the user or owner can install the data acquisition units 311, 312 and the data collection unit 320 right away. No further configuration of the data acquisition units 311, 312 and the data collection unit 320 may be needed and the data acquisition units 311, 312 may instantly send their acquired data to the data collection unit 320. Thus, mounting the data acquisition units 311, 312 and the data collection unit 320 is, even for an unexperienced user, very easy and time-saving and the data collection and monitoring system 300 can be easily and fast put into operation.

Another option, besides pre-pairing, may be to configure the data acquisition units 311, 312 and the data collection unit 320 in such a way as to ensure a facilitated pairing process. For example, the data collection unit 320 may comprise a processing unit 332 configured to perform a pairing process between the data collection unit 320 and at least one data acquisition unit 311, 312 located in the hygiene equipment, the at least one data acquisition unit 311, 312 acquiring data indicating the hygiene equipment status. The pairing process will be described in more detail between the data acquisition unit 311 and the data collection unit 320 with reference to FIGS. 3A and 3B but is representative for any other data acquisition unit and data collection unit. Not only one data acquisition unit can be paired with the data collection unit, but a plurality of data acquisition units can be paired sequentially or at the same time with the data collection unit. Thus, it is possible to pair a desired number of data acquisition units 311, 312 to a data collection unit 320 depending on the scenario in which the data collection and monitoring system 300 is to be mounted. The data collection unit 320 may furthermore have a stored threshold, wherein the threshold indicates a predetermined number of data acquisition units 311, 312 that can be paired with the data collection unit 320. Thus, the number of data acquisition units 311, 312 to be paired to the data collection unit 320 may be limited by the threshold, the threshold indicating the maximum number of data acquisition units 311, 312 to be paired with the data collection unit 320.

In general, the pairing process may occur by, for example, using near field communication, a Bluetooth signal, entering a PIN or other identification, scanning a bar code or QR code, taking a picture of an identification label, using a label having an identification number, or pressing a button on one or all of the devices to be paired, i.e., the data acquisition units 311, 312 and the data collection unit 320.

Another embodiment is illustrated in FIG. 2C, wherein no data collection unit 320 is needed, but the data acquisition units 311, 312 transmit their acquired data directly to a terminal 360 using, for example, Bluetooth Low Energy (BLE) radio types. The terminal 360 may be any type of user device or personal computing device as described in more detail above.

The terminal 360 may be arranged to collect data indicating hygiene equipment status, wherein the terminal 360 may comprise a receiving unit 333 configured to receive inbound data directly from hygiene equipment, i.e., from the respective data acquisition unit of the hygiene equipment, via D2D communication. The terminal 360 may further comprise an output unit 334 configured to output outbound data, wherein the outbound data is based on the inbound data. The pairing process between the data acquisition units 311, 312 and the terminal 360 may be the same as the pairing process between the data acquisition units 311, 312 and the data collection unit 320. In addition, the functions and features of a D2D communication has been described in much detail above. Thus, a detailed description of the pairing process and the D2D communication is omitted at this point for conciseness reasons.

FIG. 3A illustrates an embodiment of a pairing process between a data acquisition unit 311 and a data collection unit 320. Any other data acquisition unit may be used for pairing. If an embodiment as described with reference to FIG. 2C is used, the pairing process is performed correspondingly between the data acquisition units 311, 312 and the terminal 360 instead of the data collection unit 320.

In this embodiment as illustrated with respect to FIG. 3A, the data acquisition unit 311 may send a pairing request to the data collection unit 320 in order to indicate that the data acquisition unit 311 requests to be paired to the data collection unit 320 (S1-1). The data collection unit 320 may process the pairing request from the data acquisition unit 311 in S1-2 which may include checking the correctness of a PIN or identification if PIN or identification is needed for pairing, or any other authentication requirements. If the data collection unit 320 stores a threshold indicating the maximum number of data acquisition units to be paired with the data collection unit 320, the data collection unit 320 may check whether it can be paired to a further data acquisition unit 322 without exceeding the threshold. If no authentication or threshold requirements are given, step S1-2 can be omitted.

Afterwards, the data collection unit 320 may transmit a response message to the data acquisition unit 311 indicating whether or not the pairing has succeeded (S1-3). For example, the data collection unit 320 may send an acknowledgment message to the data acquisition unit 311 to indicate that the data collection unit 320 and the data acquisition unit 311 are now paired. The data collection unit 320 may furthermore send a message, for example a no-acknowledgement message, when pairing did not work and the data collection unit 320 and the data acquisition unit 311 are not paired. Another option is that the data collection unit 320 omits sending a message about unsuccessful pairing, wherein the data acquisition unit 311 interprets silence from the data collection unit 320 in a predetermined time period as unsuccessful pairing.

FIG. 3B illustrate another embodiment of a pairing process between a data acquisition unit 311 and a data collection unit 320. Again, any other data acquisition unit may be used for pairing, or a pairing process between a data acquisition unit and a terminal 360 of FIG. 2C instead of the data collection unit 320 may be performed. In this embodiment, the data collection unit 320 may now start the pairing process by sending a pairing request to the data acquisition unit 311 in order to indicate that the data collection unit 320 requests to be paired to the data acquisition unit 311 (S2-1). The data acquisition unit 311 may process the pairing request from the data collection unit 320 in S2-2 which may include checking the correctness of a PIN or identification if PIN or identification is needed for pairing, or any other authentication requirements. If no authentication requirements are given, step S2-2 can be omitted.

Afterwards, the data acquisition unit 311 may transmit a response message to the data collection unit 320 indicating whether the pairing has succeeded (S2-3). For example, the data acquisition unit 311 may send an acknowledgment message or any other message to the data collection unit 320 to indicate that the data collection unit 320 and the data acquisition unit 311 are now paired. The data acquisition unit 311 may furthermore send a message, for example a no-acknowledgement message, when pairing did not work and the data collection unit 320 and the data acquisition unit 311 are not paired. Another option is that the data acquisition unit 311 omits sending a message about unsuccessful pairing, wherein the data collection unit 320 interprets silence from the data acquisition unit 311 in a predetermined time period as unsuccessful pairing.

Instead of having a pairing process between a data acquisition unit and the data collection unit 320, a pairing process can also be performed between the data collection unit 320 and the terminal 350. For conciseness reasons, it is referred to the description with respect to FIGS. 3A and 3B, wherein the data acquisition unit 311 is replaced by the terminal 350 for the pairing process. The structure and configuration of the pairing process described with respect to FIGS. 3A and 3B are equal to a pairing process between the data collection unit 320 and the terminal 350.

After successful pairing of at least one data acquisition unit and the data collection unit 320, the data collection unit may receive inbound data from the at least one data acquisition unit. If the at least one data acquisition unit is directly paired to a terminal as illustrated in FIG. 2C, the terminal 360 may receive inbound data from the at least one data acquisition unit. In both cases, the inbound data indicates the hygiene equipment status of the respective pieces of hygiene equipment. The data collection unit 320 unit may comprise a processing unit 332 configured to process the inbound data, wherein the transmitting unit 331 of the data collection unit is configured to transmit outbound data, the outbound data being based on the processed inbound data. In the case of the embodiment as illustrated in FIG. 2C, the terminal 360 may comprise a processing unit configured to process the inbound data, wherein the output unit 334 of the terminal 360 is configured to output outbound data, the outbound data being based on the processed inbound data. In both cases, as illustrated in FIGS. 2B and 2C, processing of the inbound data may, for example, comprise evaluating the acquired data about the hygiene equipment status and outputting an alarm or alert when the hygiene equipment status falls under a predetermined threshold indicating that the respective piece of hygiene equipment needs to be refilled or needs to be cleaned. Another option may, for example, comprise evaluating the acquired data about the hygiene equipment status and outputting an alarm or alert when the hygiene equipment status exceeds a predetermined threshold indicating that the respective piece of hygiene equipment needs to be emptied. Another option may, for example, comprise evaluating the acquired data about the hygiene equipment status and outputting an alarm or alert when the hygiene equipment status exceeds a predetermined threshold indication that a washing room, or any other facility needs to be cleaned. In the embodiment as illustrated in FIG. 2B, the data collection unit 320 may, for example, transmit the processed data or the alarm or alert to a terminal 350 being a user device or any personal computer device and being paired to the data collection unit 320. The data collection unit may, for example, solely process the inbound data during a predetermined time period for energy-saving.

Figure 4A:
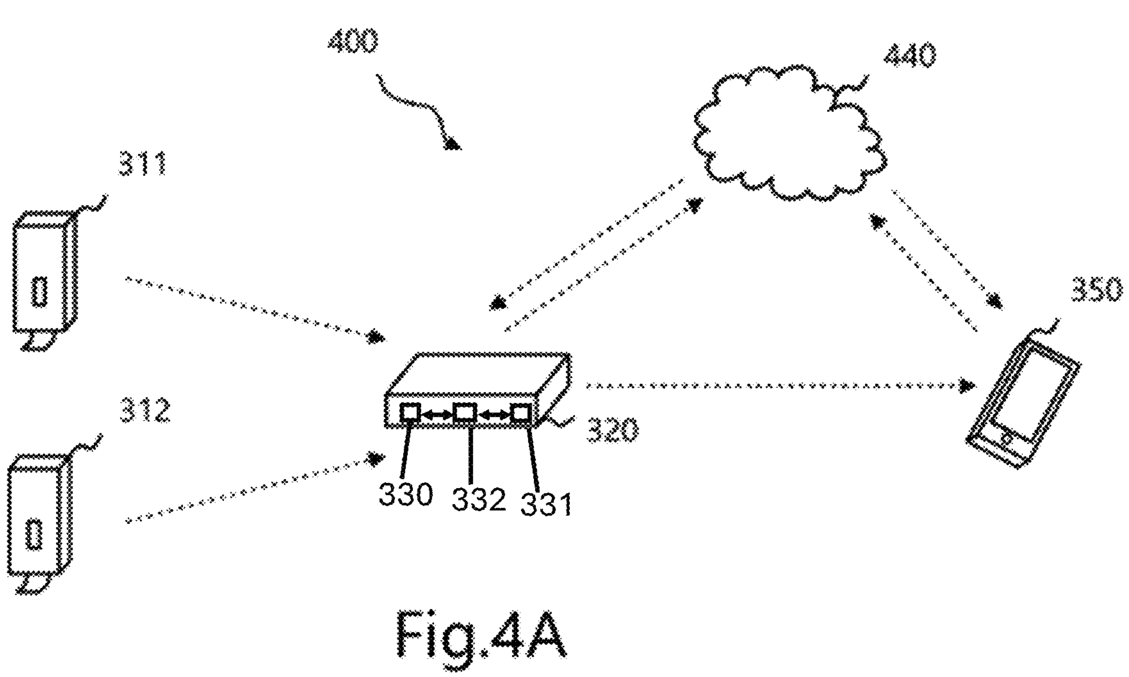
FIGS. 4A and 4B show schematic views of a data collection and monitoring system and a Cloud system.

FIG. 4A shows another embodiment of the present invention, wherein a system 400 comprising two data acquisition units 311, 312, a data collection unit 320 and a terminal 350 are illustrated. The data acquisition units 311, 312, the data collection unit 320 and the terminal 350 have been described in more detail above. Thus, for conciseness reasons, a detailed description is omitted.

The system 400 as illustrated in FIG. 4A furthermore comprises a Cloud system 440, wherein the transmitting unit of the data collection unit 320 is further configured to transmit the outbound data to the Cloud system 440. The outbound data may be the acquired data of the data acquisition units 311, 312 indicating the hygiene equipment status, wherein the acquired data may be processed by the data collection unit 320 before being transmitted to the Cloud system 440. However, the data collection unit 320 may also transmit the acquired data to the Cloud system 440 without processing the acquired data before.

The data collection unit 320 may transmit the outbound data to both the Cloud system 440 and the terminal 350 at the same time or sequentially, or may transmit the outbound data only to the Cloud system 440 or the terminal 350. The terminal 350 may interact with the Cloud system 440 via an application software or a web interface in order to retrieve or review the data stored in the Cloud system 440. By transmitting the data to the Cloud system 440, a back-up solution is created for securely storing the data. In addition, a user operating the terminal 350 may be able to access the Cloud system 440 and review or retrieve the data independent of whether or not the terminal 350 is in the range of the data collection unit 320 in which the terminal 350 is able to receive data from the data collection unit 320. Furthermore, the terminal 350 and the Cloud system 440, or the data collection unit 320 and the Cloud system 440, may be able to communicate bi-directionally with each other, wherein the Cloud system 440 may transmit data to the terminal 350 and/or to the data collection unit 320, the data ranging from advertising, more advanced analysis by taking other data-sources into account to firmware updates.

When receiving data from the data collection unit 320, either processed or unprocessed data, the terminal 350 may be configured to process the outbound data received from the data collection unit 320. The terminal 350 may furthermore output data indicating the hygiene equipment status, the data being based on the received outbound data from the data collection unit 320. For example, the terminal 350 may output an alarm or alert to a user indicating that the hygiene equipment status has exceeded or has fallen under a predetermined threshold, such that the respective pieces of hygiene equipment have to be emptied or refilled. Another option may be that the terminal 350 may receive data from the Cloud system 440, either processed or unprocessed data, and the terminal 350 may be configured to process the data received from the Cloud system 440 before outputting the data.

The terminal 350 may furthermore comprise an application software installed on the terminal 350, the application software being executable on the terminal. The application software may instruct the terminal 350 to receive the outbound data, and may instruct an output unit 334 of the terminal 350 to output data based on the outbound data. The output data may be unprocessed or processed outbound data, wherein the outbound data may be based on the hygiene equipment status acquired by data acquisition units In addition, with the application software, a user of the terminal 350 may be able to organize the data acquisition units 311, 312, by giving them different names or checking their locations. By organizing the data acquisition units 311, 312, the user may be able to quickly understand which pieces of hygiene equipment need to be refilled or emptied and may be able to quickly and accurately retrieve information about the location of the pieces of hygiene equipment. This might be essential in large data collection and monitoring systems with a plurality of data acquisition units located in different types of hygiene equipment. Thus, the user may be able to keep track of the overall system independent of the amount of data acquisition units being used in the system.

Figure 4B:
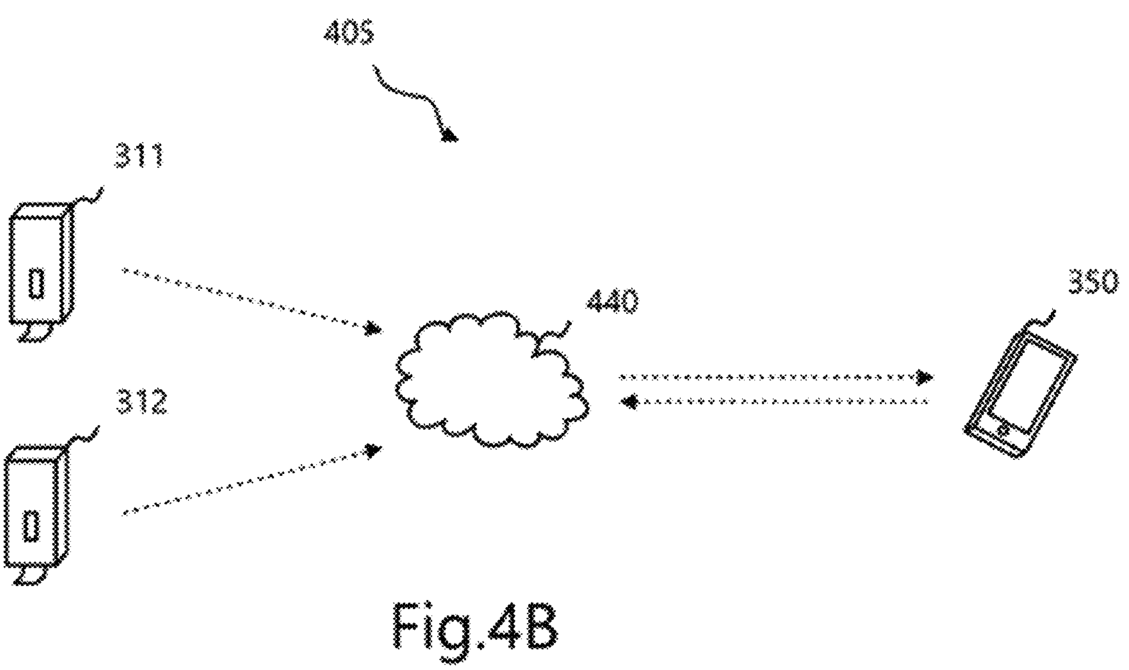

FIG. 4B shows another embodiment, wherein the data acquisition units 311, 312 transmit their acquired data indicating the hygiene equipment status directly to a Cloud system 440 via Narrowband (NB) IoT or Category M1 (CAT-M1). The terminal 350 may then receive unprocessed or processed data from the Cloud system 440, the unprocessed or processed data being based on the data acquired by the data acquisition units 311, 312. The communication between the Cloud system 440 and the terminal 350 may be similar as described with reference to FIG. 4A. Thus, a detailed description is omitted at this point due to conciseness reasons.

Figure 5:
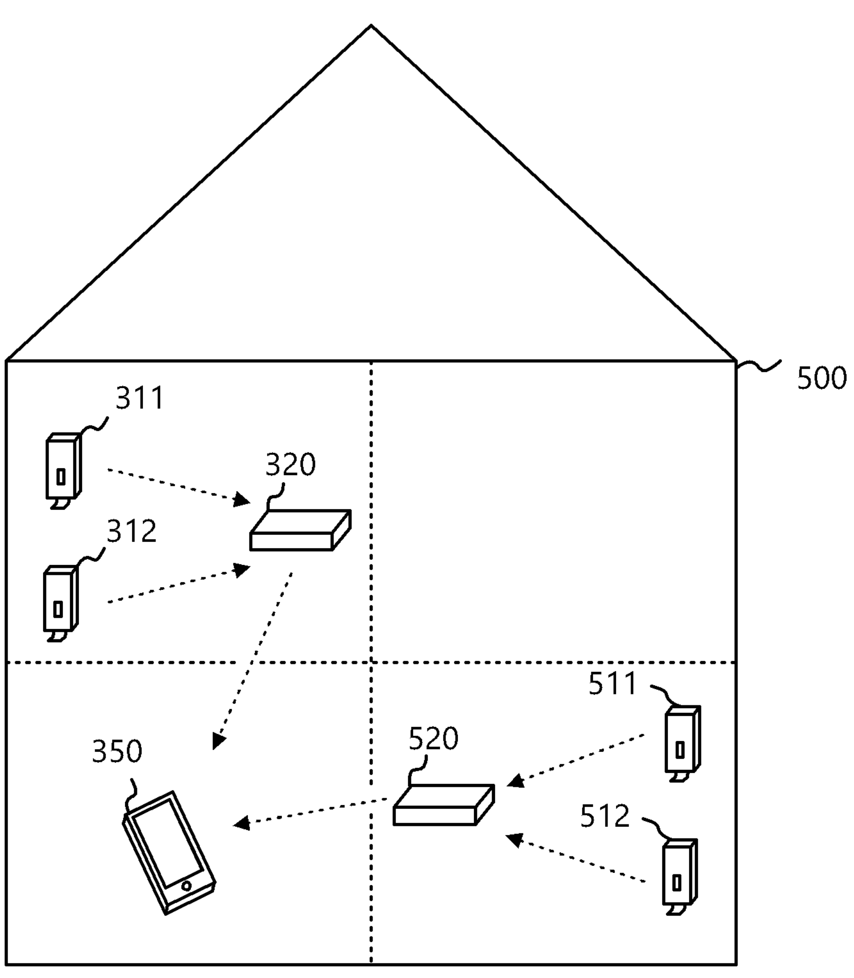
FIG. 5 shows a schematic view of an installation of a data collection and monitoring system in a representative building.

FIG. 5 illustrates a building 500 comprising one terminal 350, multiple data collection units 320, 520 and multiple data acquisition units 311, 312, 511, 512. The building 500 may be a hospital, school, office building, residential building, shopping center or any other building in which a user wishes to install a data collection and monitoring system. The terminal 350, the data collection units 320, 520 and the data acquisition units 311, 312, 511, 512 are equal to the terminal, the data collection units and the data acquisition units as described in more detail above and the data acquisition units 311, 312, 511, 512 may be mounted in any pieces of hygiene equipment for measuring the hygiene equipment status. For conciseness reasons, a detailed description of the terminal, the data collection units and data acquisition units is thus omitted at this point.

For example, a user wishes to mount several data acquisition units 311, 312, 511, and 512 in different rooms of the building 500, the different rooms being indicated by the dotted squares in FIG. 5. For example, the user may install the data acquisition units 311 and 312 in a room in the left corner of an upper floor and may install the data acquisition units 511 and 512 in a room in the right corner of a lower floor. Even if data acquisition units can be paired to a data collection unit which is not in the same room, floor, or building as the data acquisition units, sometimes it is not possible to pair all data acquisition units to solely one data collection unit. Reasons therefor are, for example, the limited transmission range of the data collection unit and/or the data acquisition units.

For example, in building 500 it is not possible to pair all data acquisition units 311, 312, 511, and 512 to one data collection unit, such that the user mounts two data collection units 320 and 520, one data collection unit for each room. The data acquisition units 311 and 312 are thus paired to data collection unit 320 and the data acquisition units 511 and 512 are thus paired to data collection unit 520. The data collection units 320 and 520 may then transmit the collected data about the hygiene equipment status from the respective data acquisition units 311, 312, and 511, 512 directly to the terminal 350 via D2D communication. For conciseness reasons, a detailed description of D2D communication is omitted at this point and it is referred to the description of D2D given above.

Even if multiple data collection units 320 and 520 are given in the system of FIG. 5, the user of the terminal 350 is able to check the hygiene equipment status of the pieces of hygiene equipment on one terminal 350. It is not necessary that the terminal 350 is in the same room, floor or building of the respective data collection units 320 and 520, but the terminal 350 may be located anywhere in the range of transmission of the data collection units 320 and 520. For example, as illustrated in FIG. 5, the terminal 350 may be in a room in the left corner of the first floor of the building 500 and may receive the outbound data from the data collection units 320 and 520 if the terminal 350 is still in the transmission ranges of the data collection units 320 and 520. Thus, by ensuring that a plurality of data collection units can transmit data directly to one terminal via D2D communication, the size of the data collection and monitoring system can be individually chosen, thus ensuring flexibility of the data collection and monitoring system. Furthermore, by ensuring that the outbound data of the plurality of data collection units is transmitted to one terminal 350, the user of the terminal 350 can keep an overview of the whole system and the hygiene equipment status of the pieces of hygiene equipment. Thus, it is ensured that the user can easily and flexibly observe the hygiene equipment status of a large area comprising multiple pieces of hygiene equipment.

In summary, the data collection and monitoring system as illustrated in FIG. 5 may comprise a plurality of data collection units 320, 520, each of the data collection units 320, 520 configured to collect data indicating the hygiene equipment status, wherein the plurality of data collection units 320, 520 is configured to transmit outbound data to one terminal 350 via D2D communication. Also, in this embodiment of FIG. 5, the plurality of data collection units may be further configured to transmit outbound data to a Cloud system as described in more detail above for one data collection unit in FIG. 4.

Figure 6A:
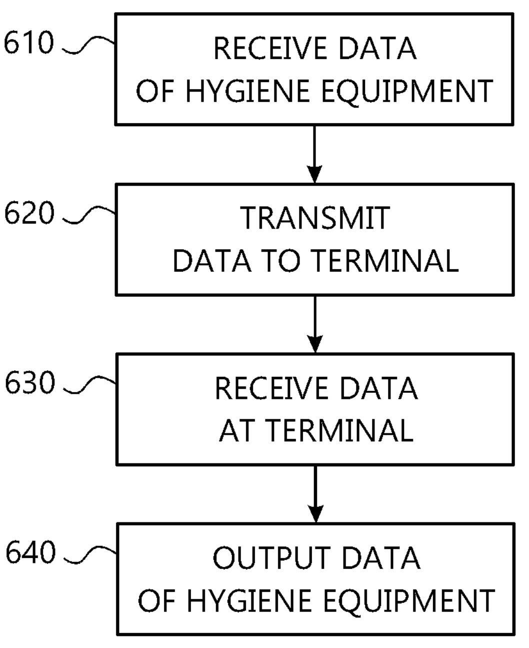
FIGS. 6A and 6B show a flowchart of method embodiments of the present invention.

FIG. 6A illustrates a method for monitoring a hygiene equipment status. The method may comprise the step of receiving, by a data collection unit 320, inbound data indicating the hygiene equipment status from hygiene equipment (step 610). Thus, the data collection unit 320 may receive inbound data of at least one hygiene equipment, the inbound data indicating the hygiene equipment status of the respective hygiene equipment.

In step 620, the data collection unit may transmit outbound data directly to a terminal 350 via device-to-device, D2D, communication, wherein the outbound data is based on the inbound data.

In step 630, the terminal 350 may receive the outbound data from the data collection unit 320 and may optionally output the outbound data of the pieces of hygiene equipment (step 640). The terminal 350 may, for example, display the outbound data on a display unit, such that a user is able to review and check the outbound data.

Instead of transmitting data about the hygiene equipment status acquired by the data acquisition units to the data collection unit 320, the steps 610 and 620 can be omitted and the data may be directly transmitted to a terminal 360 as also illustrated with respect to FIG. 2C. Thus, in steps 630 and 640, the terminal 360 may receive data from hygiene equipment, i.e., data acquisition units, and may optionally output data based on the hygiene equipment status.

Instead of transmitting the outbound data to the terminal 350 or additionally to transmitting the outbound data to the terminal 350, the outbound data may be also transmitted to a Cloud system as described in more detail above.

Figure 6B:
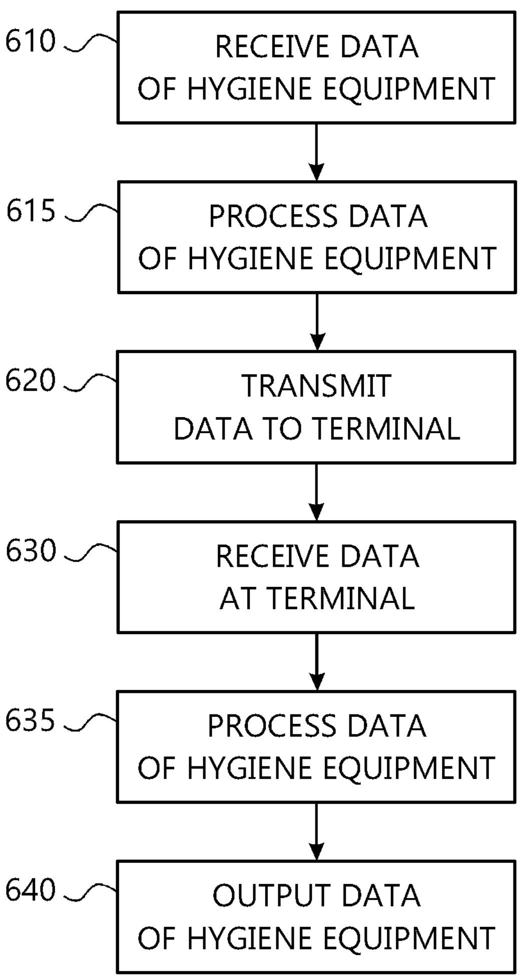

FIG. 6B illustrates a further method for monitoring a hygiene equipment status, wherein the steps 610, 620, 630, and 640 are similar to the steps described for FIG. 6A.

The method as illustrated in FIG. 6B may comprise the step of receiving, by a data collection unit 320, inbound data indicating the hygiene equipment status (step 610). Thus, the data collection unit 320 may receive inbound data of at least one hygiene equipment, the inbound data indicating the hygiene equipment status of the respective hygiene equipment.

In step 615, the data collection unit 320 may process the inbound data as described in more detail above. Processing of the inbound data may, for example, comprise evaluating the acquired data about the hygiene equipment status and outputting an alarm or alert when the hygiene equipment status falls under a predetermined threshold indicating that the respective piece of hygiene equipment needs to be refilled. Another option may, for example, comprise evaluating the acquired data about the hygiene equipment status and outputting an alarm or alert when the hygiene equipment status exceeds a predetermined threshold indicating that the respective piece of hygiene equipment needs to be emptied.

In step 620, the data collection unit 320 may transmit outbound data directly to a terminal 350 via device-to-device, D2D, communication, wherein here the outbound data is based on the processed inbound data.

In step 630, the terminal 350 may receive the outbound data of the processed inbound data from the data collection unit 320. Then, the terminal 350 may process the received outbound data further (step 635) and may output the processed outbound data of the pieces of hygiene equipment (step 640). The terminal 350 may, for example, display the processed outbound data on a display unit, such that a user is able to review and check the processed outbound data, or may output an alarm or alert to warn the user about an empty or full piece of hygiene equipment that needs to be refilled or emptied.

The method as illustrated in FIG. 6B does not need to contain both steps 615 and 635 at once. It is also possible to have a method which solely includes one of the steps 615 and 635.

The present invention as described above provides a data collection and monitoring system which can be used by users who want to experience the advantages of a data collection and monitoring system without having to perform a complete installation. Thus, the present invention provides a data collection unit, a data collection and monitoring system, and a method thereof, wherein the installation thereof is easy, time-saving, and cost-efficient.

If, however, at some point it is decided to switch from a relatively small data collection and monitoring system to a more complex and larger data collection and monitoring system, the configuration of the data collection unit may be changed. For example, the data collection unit may be able to work in two modes, wherein one mode may limit the amount of data acquisition units paired to the data collection unit and may limit the complexity of the whole data collection and monitoring system. In contrast thereto, the other mode may allow the data collection and monitoring system to forward data towards a wireless network as they are such known. Thus, in the other mode, the data collection and monitoring system may be embedded in established wireless networks as they are such known and as they are, for example, described with reference to FIG. 2A.

Although detailed embodiments have been described, these only serve to provide a better understanding of the invention defined by the independent claims and are not to be seen as limiting.

What is claimed is:

1. A data collection unit arranged to collect data indicating hygiene equipment status, comprising:

a receiving unit configured to receive inbound data from a first data acquisition unit among a plurality of data acquisition units, the inbound data indicating the hygiene equipment status of a hygiene equipment;

a processing unit configured to process the inbound data during a predetermined time period; and a transmitting unit configured to selectively operate in different modes to selectively transmit data between a terminal and a base station or a core network, wherein the base station or the core network transmits outbound data to the terminal, wherein the outbound data is based on the inbound data and indicates the hygiene equipment status, wherein in a first mode among the different modes, the transmitting unit is configured to transmit the outbound data directly to the terminal via device-to-device, D2D, communication without traversing the base station or the core network, and in a second mode among the different modes, the transmitting unit is configured to transmit the outbound data to the base station or the core network, and wherein the terminal is configured to receive the outbound data indicating the hygiene equipment status from the data collection unit, to process the outbound data indicating the hygiene equipment status received from the data collection unit, and to output an alarm signal indicating the hygiene equipment status fails to meet a predetermined threshold so as to indicate the hygiene equipment requires emptying or refilling, and wherein when operating in the first mode the data collection unit is paired to a first number of data acquisition units among a total possible number of the plurality of data acquisition units capable of pairing with the data collection unit to limit an amount of data acquisition units connected to the data collection unit, and when operating in the second mode the data collection unit is paired to a second number of data acquisition units among the total possible number of data acquisition units capable of pairing with the data collection unit to increase the amount of data acquisition units connected to the data collection unit.

2. The data collection unit of claim 1, wherein the first data acquisition unit is configured to be pre-paired with the data collection unit.

3. The data collection unit according to claim 1, further comprising:

a processing unit configured to perform a pairing process between the data collection unit and at least one data acquisition unit located in a hygiene equipment, the at least one data acquisition unit acquiring data indicating the hygiene equipment status.

4. The data collection unit according to claim 1, wherein the transmitting unit is configured to transmit the processed inbound data as the outbound data.

5. The data collection unit according to claim 1, wherein the transmitting unit is further configured to transmit the outbound data to a Cloud system in response to operating in the second mode.

6. A data acquisition unit in hygiene equipment arranged to acquire data indicating hygiene equipment status, the data acquisition unit being configured to be paired to a data collection unit according to claim 1.

7. A data acquisition unit in hygiene equipment arranged to acquire data indicating hygiene equipment status, the data acquisition unit being configured to be selectively paired to a data collection unit to transmit outbound data indicating the hygiene equipment status to a terminal, wherein the terminal is configured to receive the hygiene equipment status, to process the outbound data indicating the hygiene equipment status received from the data collection unit, and to output an alarm signal indicating the hygiene equipment status fails to meet a predetermined threshold so as to indicate the hygiene equipment requires emptying or refilling, wherein the data collection unit selectively operates in a reduced complexity mode that prevents pairing with the data acquisition unit corresponding to the hygiene equipment to limit an amount of hygiene equipment connected to the data collection unit, and a complexity mode that allows pairing with the data acquisition unit corresponding to the hygiene equipment to increase the amount of hygiene equipment connected to the data collection unit.

8. A data collection and monitoring system, comprising:

a data collection unit configured to receive inbound data that is generated by a hygiene equipment and that indicates a hygiene equipment status of the hygiene equipment, wherein the data collection unit is configured to process the inbound data during a predetermined time period, transmit outbound data indicating the hygiene equipment status based on the inbound data, and is configured to selectively switch between a first mode and a second mode based on one or both of an amount of inbound data to receive and a destination of the outbound data; and a terminal configured to receive the outbound data from the data collection unit, wherein in the first mode, the data collection unit is configured to transmit the outbound data directly to the terminal via device-to-device, D2D, communication without traversing a base station or a core network, and in the second mode, the data collection unit is configured to transmit the outbound data to the base station or the core network, and wherein the terminal is configured to receive the outbound data indicating the hygiene equipment status from the data collection unit, to process the outbound data indicating the hygiene equipment status received from the data collection unit, and to output an alarm signal indicating the hygiene equipment status fails to meet a predetermined threshold so as to indicate the hygiene equipment requires emptying or refilling, wherein when operating in the first mode the data collection unit is paired to a first number of hygiene equipment among the plurality of hygiene equipment to limit an amount of hygiene equipment connected to the data collection unit, and when operating in the second mode the data collection unit is paired to a second number of hygiene equipment among the plurality of hygiene equipment that is greater than the first number to increase the amount of hygiene equipment connected to the data collection unit.

9. The data collection and monitoring system of claim 8, wherein the data collection unit switches between a first and second modes to selectively transmit the outbound data between the terminal and the base station or the core network, wherein the base station or the core network transmits the outbound data to the terminal.

10. The data collection and monitoring system of claim 9, wherein a data acquisition unit is configured to be pre-paired with the data collection unit.

11. The data collection and monitoring system according to claim 8, wherein the data collection unit and at least one data acquisition unit located in a hygiene equipment are configured to perform a pairing process.

12. The data collection and monitoring system according to claim 8, wherein the data collection unit is further configured to process the inbound data, and wherein the data collection unit is configured to transmit the processed inbound as the outbound data.

13. The data collection and monitoring system according to claim 8, wherein the data collection unit is further configured to transmit the outbound data to a Cloud system.

14. The data collection and monitoring system according to claim 8, wherein the terminal is configured to process the received outbound data.

15. The data collection and monitoring system according to claim 8, wherein the terminal is configured to output data indicating the hygiene equipment status, the data output by the terminal being based on the received outbound data.

16. The data collection and monitoring system according to claim 8, wherein the terminal comprises an application software installed on the terminal, the application software being executable on the terminal, wherein the application software instructs the terminal to receive the outbound data, and wherein the application software instructs an output unit of the terminal to output data based on the outbound data.

17. A method for monitoring a hygiene equipment status, the method:

determining to operate hygiene equipment in a first data collection system;

pairing a plurality of hygiene equipment with a data collection unit, the data collection unit configured to selectively operate in a complex mode to transmit data in a first data collection system that includes one or both of a base station and a core network, and a reduced complexity mode to transmit data in a second data collection system that excludes one or both of the base station and the core network, receiving, by the data collection unit, inbound data indicating the hygiene equipment status from a first hygiene equipment of the plurality of hygiene equipment;

processing, by the data collection unit, the inbound data during a predetermined time period;

transmitting, by the data collection unit, outbound data directly to a terminal via device-to-device, D2D, communication without traversing one or both of the base station or the core network in response to operating the data collection unit in the reduced complexity mode;

receiving, by the terminal, the outbound data directly from the data collection unit in response to operating the data collection unit in the reduced complexity mode;

transmitting, by the data collection unit, outbound data to the base station or the core network in response to operating the data collection unit in the complex mode; and receiving, by the terminal, the outbound data from one or both of the base station or the core network in response to operating the data collection unit in the complex mode, wherein the outbound data is based on the inbound data, and wherein the terminal is configured to process the outbound data indicating the hygiene equipment status received from the data collection unit and outputs an alarm signal indicating the hygiene equipment status fails to meet a predetermined threshold so as to indicate the first hygiene equipment requires emptying or refilling, wherein when operating in the reduced complexity mode the data collection unit is paired to a first number of hygiene equipment among the plurality of hygiene equipment to limit an amount of hygiene equipment connected to the data collection unit, and when operating in the complex mode the data collection unit is paired to a second number of hygiene equipment among the plurality of hygiene equipment that is greater than the first number to increase the amount of hygiene equipment connected to the data collection unit.

* * * * *